March 3, 1964 H. E. BIRCH-IENSEN 3,123,044
APPARATUSES FOR RECORDING POULTRY EGG PRODUCTION
Filed Jan. 8, 1962 3 Sheets-Sheet 1
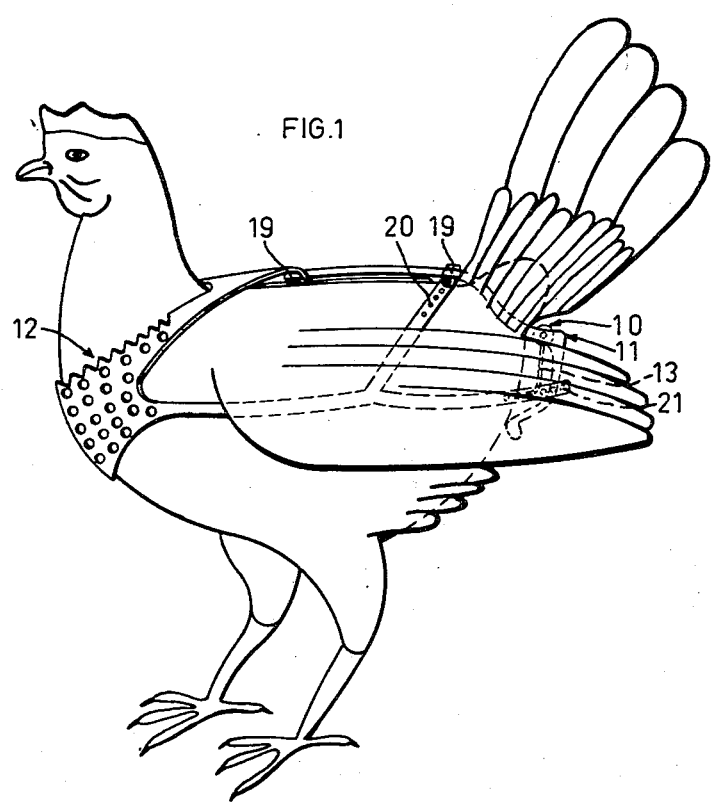

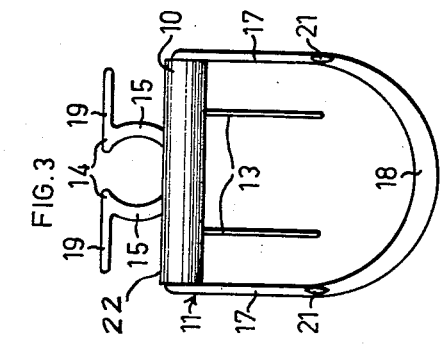
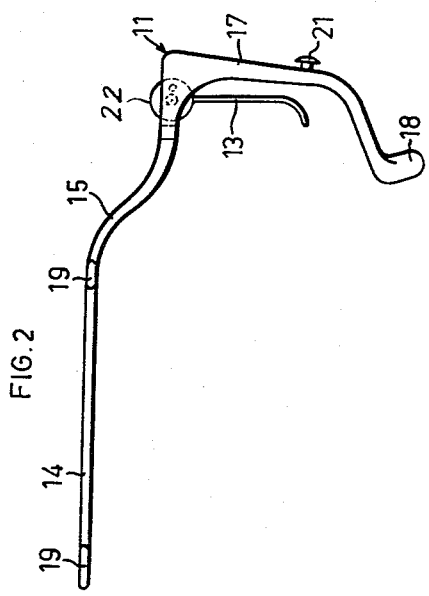
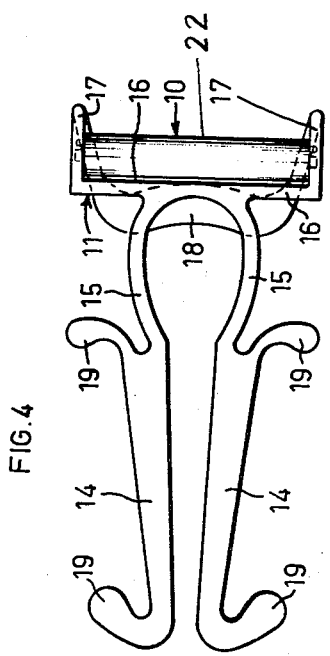

March 3, 1964 H. E. BIRCH-IENSEN 3,123,044
APPARATUSES FOR RECORDING POULTRY EGG PRODUCTION
Filed Jan. 8, 1962 3 Sheets-Sheet 3
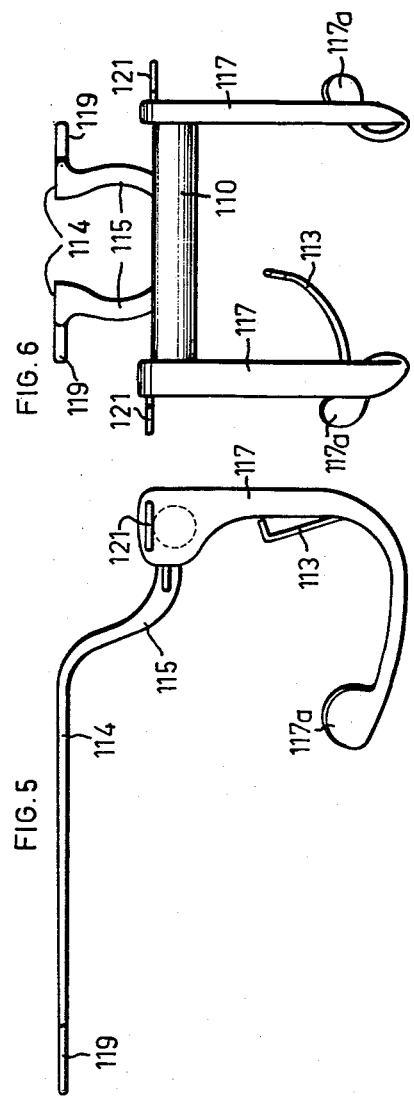
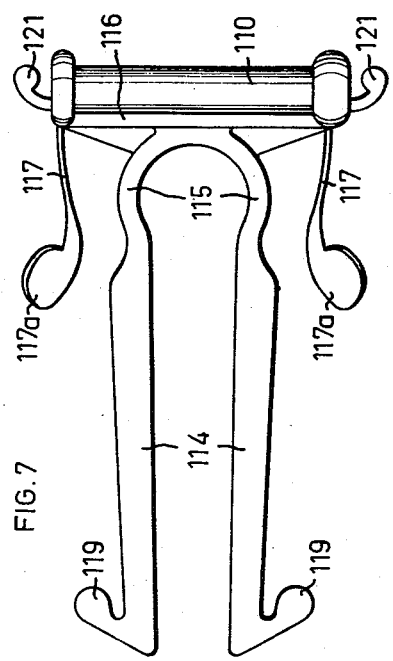

United States Patent Office 3,123,044
Patented Mar. 3, 1964

3,123,044
APPARATUSES FOR RECORDING POULTRY
EGG PRODUCTION
Hans Eugen Birch-Jensen, Hallstorps Gard,
Billeberga, Sweden
Filed Jan 8, 1962, Ser. No. 164,819
Claims priority, application Great Britain Oct. 25, 1961
5 Claims. (Cl. 119—1)

This is a continuation in part of the application Serial No. 66,877, filed on November 2, 1960, and now abandoned.

This invention relates to poultry breeding and egg production and more particularly to recording the egg production of the individual hens.

Hitherto such individual recording of egg production has mostly been made with the use of special checking cages in which the hens are shut in one at the time for a certain period. This method, however, requires extensive additional housing facilities and much extra work and besides it is not entirely reliable since it does not permit the hens being controlled to live in flocks and to follow their natural habits, which may unfavourably affect their egg production.

Specific trap-nests have also been suggested for registering in one way or other the hens laying eggs in said nests but this arrangement also has proved too expensive in erection and operation.

Finally it has also been suggested, e.g. by U.S. patent specification 1,861,854, to provide each laying hen with an egg production recording apparatus comprising a counter which can be fastened to the hen and carried by it for a long time, say one year, and which includes a movable input element adapted to be actuated by, and readably to record, each egg laid by the hen during this time.

However, no practically useful means has been developed from this idea, and a very essential aspect has been neglected, viz. that of providing a perfect device for fastening the counter to the hen. The prior-art fastening devices are unsatisfactory because they do not locate and orient the counter, and particularly its movable input element, in a sufficiently steady and exact manner relative to the evacuation opening of the hen, through which the eggs emerge. Practical experiments have shown that such localization and orientation is of the utmost importance to realize a recording of all eggs laid and to safeguard that each egg laid is recorded but once.

It has also proved necessary efficiently to protect particularly the input element of the counter so that said element cannot get caught on some object in the hen's environment and neither be actuated by the hen itself when it trims the tail feathers with the beak, which could damage the input element or cause it to make recordings without any eggs being laid.

The invention overcomes these drawbacks and relates to a holder to be fastened to a hen by means of a harness and adapted to carry a counter having a movable input element therefor located beneath the hen's tail, including a back portion to be fastened along the hen's spine, and a pair of limbs extending from the rear end of the back portion and conformed to embrace the hen's tail root. Characteristic for the new holder is that the outer or rear ends of the limbs are fixedly interconnected and prolonged by a pair of arms which are conformed in such a way as to be directed, on application of the holder, downwardly behind the hen's rump and to bear against the hen's body only with their lower parts.

For a better understanding the invention will be described in more detail with reference to the accommpanying drawings, in which:

FIGURE 1 is a view of a hen carrying an egg production recording apparatus in the form of a counter fastened to the hen by means of a holder according to the invention in combination with a harness;

FIGURE 2 is a side elevational view to an enlarged scale of the holder-counter assembly of the unit shown in FIGURE 1;

FIGURE 3 is a rear end view of the structure illustrated in FIGURE 2;

FIGURE 4 is a top plan view of the structure illustrated in FIGURE 2;

FIGURE 5 is a view, similar to FIGURE 2, illustrating a modified form of holder-counter assembly; and FIGURE 6 is a rear end view of structure illustrated in FIGURE 5.

Terms such as "from the left," "from the rear" etc., refer throughout to the hen carrying the apparatus.

In FIG. 1 the hen is shown carrying a counter 10 of cylindrical shape placed in horizontal transverse position just beneath the hen's tail root where it is retained by a holder 11 which in turn is fixed to the hen by means of a harness 12. The counter has an input element in the form of a pair of prongs 13 which normally depend behind the evacuation opening of the hen as shown in the figure. The prongs are rigidly connected to an outer rotatable sleeve 22 on the counter, and recording takes place when the prongs are swung rearwardly of the hen by an egg, thereby causing the sleeve to rotate through a certain angle. It is of very great importance that the prongs 13 in the position shown are held precisely in the correct position so that also large variations in regard of egg size and egg shape are encompassed within the limits of the angle of traverse of the prongs, between which limits the counter is operating.

The holder 11 for the counter, shown in FIGS. 1–4, comprises a back portion 14 which is cut longitudinally into two halves each carrying at the rear end one of a pair of limbs 15 which are conformed to embrace the hen's tail root and have their rear ends fixedly interconnected, carrying a cross member 16. From the ends of said cross member projects a pair of arms 17 which extend a short distance rearwardly and are then bent angularly downwards. In their lower parts said arms 17 are bent forwardly and interconnected by a bottom part 18. The parts 16, 17 and 18 thus constitute a closed frame, and secured in the upper portion thereof between arms 17 and along cross member 16 is the cylindrical counter 10 with its prongs 13 directed downwardly inside the frame so that they are well protected against damages and not accessible to the hen itself. The frame is of such a shape as to contact the hen's body only at the top by means of cross member 16 and at the bottom by means of the bottom part 18 which is arcuate to bear against the hen's body substantially at two points, one on each side.

The holder 11 is passed onto the hen from the rear by pulling the two halves of the back portion 14 apart so that they can be moved forward each on one side of the tail root, whereupon they are buttoned together and fixed on the back of the hen with the aid of hooks or buttons 19 and the harness 12 having buttonholes 20 therein. The arms 17 are also equipped with buttons 21 onto which the harness can be buttoned, as is shown in FIG. 1. To permit easy and rapid realization of this the holder is preferably made from a suitable thermoplastic and the harness from non-rigid plastic.

In FIGS. 5–7 there is shown a holder 111 which largely corresponds to that described in the foregoing. Thus it has a back portion 114 with a pair of hooks or buttons 119, a pair of limbs 115, a cross member 116 and a pair of arms 117 which carry a cylindrical counter 110 and which also each have a button or hook 121 for the harness.

In this instance, however, the arms 117 are not interconnected at the lower end but instead broadened into a pair of blades 117a, which are bent outwards and set in oblique position to bear against the hen's body slightly further out towards the sides and further forward than the earlier described bottom part 18. By this arrangement the blades 117a will be supported on the hen's body in such a way that the fixation, especially in lateral respect, of the holder to the hen is improved without in any way restricting the hen's freedom of motion.

The counter 110 is mounted in the same position as in the earlier described embodiment but its input element is of another design. It here consists but of a single prong 113 which projects through an opening in one of the arms 117, which is hollow, and is secured to a shaft mounted in the interior of said arm and reaching up to the uppermost portion thereof where it is operatively connected in a suitable manner to a central shaft in the counter.

It has also been considered to place the entire counter on or inside one of the arms 117 and to use a prong similar to the one shown at 113 as an input element. In such a case the cross member 116 may be dispensed with and the arms 117 in a suitably bent shape be directly connected to the limbs 115. The invention may be embodied in other specific forms without departing from the spirit or essential characteristics thereof. The present embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed and desired to be secured by United States Letters Patent is:

1. A holder to be fastened to a hen by means of a harness and adapted to carry a counter with a movable input element therefor located beneath the hen's tail for recording the hen's egg production, comprising a back portion to be fastened along the hen's spine, a pair of limbs extending from the rear end of said back portion and conformed to embrace the hen's tail root, the rear ends of said limbs being fixedly interconnected, and a pair of arms fixedly connected at one end to said rear ends of said limbs and conformed to be directed, on application of the holder on the hen, downwardly behind the hen's rump and behind and laterally outwardly of the area of said input element in the normal position thereof to form guard means thereabout and to bear against the hen's body with their lower parts to form positioning means for the holder and the input element.

2. A holder according to claim 1, further including a bottom part interconnecting the lower parts of said arms and of arcuate shape in order to bear against the hen's body substantially at two points.

3. A holder according to claim 1, in which the lower parts of said arms are bent forwardly and are shaped at their free ends to bear against the hen's body from the side.

4. A holder according to claim 1, in which said arms are adapted to retain the counter between their upper parts with the movable input element directed downwardly from the counter in position of rest.

5. A holder according to claim 1, in which said arms are adapted to retain the counter between their upper parts and one of said arms is hollow in order to enclose a shaft to be operatively connected at its upper end to a shaft in the counter and carrying at its lower end the input element protruding through an opening in the side of said arm.

References Cited in the file of this patent
UNITED STATES PATENTS
1,861,854    Greene _____ June 7, 1932